(12) United States Patent
Sato (10) Patent No.: US 10,661,410 B2
(45) Date of Patent: May 26, 2020

(54) METHOD FOR MEASURING TEMPLATE AND METHOD FOR EVALUATING SAME

(71) Applicant: SHIN-ETSU HANDOTAI CO., LTD., Tokyo (JP)

(72) Inventor: Michito Sato, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 288 days.

(21) Appl. No.: 15/761,042

(22) PCT Filed: Sep. 20, 2016

(86) PCT No.: PCT/JP2016/004293
§ 371 (c)(1),
(2) Date: Mar. 16, 2018

(87) PCT Pub. No.: WO2017/061077
PCT Pub. Date: Apr. 13, 2017

(65) Prior Publication Data
US 2018/0264620 A1    Sep. 20, 2018

(30) Foreign Application Priority Data

Oct. 7, 2015    (JP) .................................. 2015-199189

(51) Int. Cl.
*B24B 37/30*    (2012.01)
*G01B 5/06*    (2006.01)
(Continued)

(52) U.S. Cl.
CPC .............. *B24B 37/30* (2013.01); *G01B 5/061* (2013.01); *G01B 11/0608* (2013.01); *G01B 21/18* (2013.01)

(58) Field of Classification Search
CPC ....... B24B 37/32; B24B 37/345; B24B 37/30; G01B 5/061; G01B 11/0608
(Continued)

(56) References Cited

U.S. PATENT DOCUMENTS 6,206,768 B1 * 3/2001 Quek ...................... B24B 37/32
                                                          451/285
6,231,428 B1 * 5/2001 Maloney ................. B24B 49/16
                                                          451/287
(Continued)

FOREIGN PATENT DOCUMENTS

| JP | 2004-239718 A  | 8/2004 |
| WO | 2009/110180 A1 | 9/2009 |
| WO | 2014/147969 A1 | 9/2014 |

OTHER PUBLICATIONS

Jun. 12, 2018 Office Action issued in Japanese Patent Application No. 2015-199189.
(Continued)

*Primary Examiner* — George B Nguyen
(74) *Attorney, Agent, or Firm* — Oliff PLC (57) ABSTRACT

A method for measuring a template includes: preparing a measurement wafer and measuring a thickness of the measurement wafer; mounting the template on a reference plane; housing the measurement wafer in the concave portion of the template; measuring heights of the annular member and the measurement wafer from the reference plane in a state where a load is applied to the annular member of the template and the measurement wafer by using a pressing jig; and calculating a depth of the concave portion of the template in the state where the load is applied by using the pressing jig from the measured thickness of the measurement wafer and the heights of the annular member and the measurement wafer. Consequently, it is possible to measure the depth of the concave portion of the template in a state
(Continued)

closer to a state during polishing than that realized by a conventional measuring method.

6 Claims, 6 Drawing Sheets

(51) Int. Cl.
  *G01B 11/06* (2006.01)
  *G01B 21/18* (2006.01)
(58) Field of Classification Search
  USPC .......................................................... 451/41
  See application file for complete search history.

(56) References Cited

U.S. PATENT DOCUMENTS

| 2007/0143980 | A1* | 6/2007 | Doan ................. | B24B 37/32 |
| | | | | 29/407.01 |
| 2007/0243796 | A1* | 10/2007 | Torii ................. | B24B 37/32 |
| | | | | 451/5 |
| 2009/0291623 | A1* | 11/2009 | Masumura .............. | B24B 37/30 |
| | | | | 451/287 |
| 2015/0165587 | A1* | 6/2015 | Lin .................. | B24B 37/32 |
| | | | | 451/41 |
| 2016/0008947 | A1 | 1/2016 | Sato | |

OTHER PUBLICATIONS

Apr. 19, 2018 International Preliminary Report on Patentability issued in International Patent Application No. PCT/JP2016/004293.
Nov. 22, 2016 International Search Report issued in International Patent Application No. PCT/JP2016/004293.

* cited by examiner

METHOD FOR MEASURING TEMPLATE AND METHOD FOR EVALUATING SAME

TECHNICAL FIELD

The present invention relates to a method for measuring a template and a method for evaluating the same.

BACKGROUND ART

To polish semiconductor wafers (which will be also simply referred to as wafers hereinafter) as typified by silicon wafers, a method for polishing both surfaces at the same time or a method for polishing a single surface is carried out.

Figure 8:
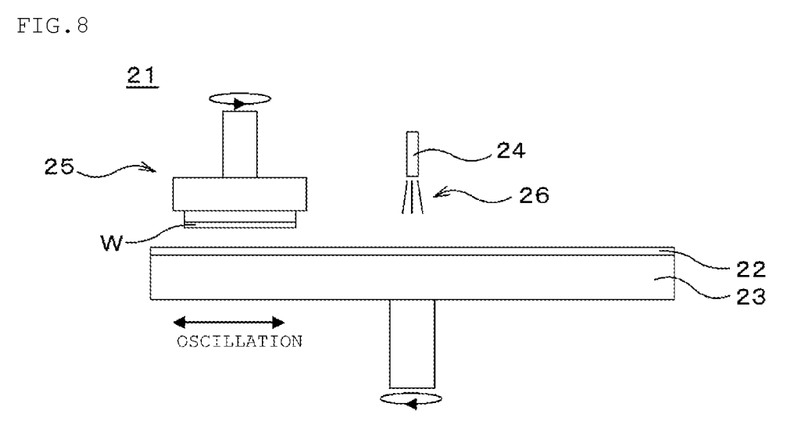
FIG. 8 is a schematic view showing a general single-side polishing apparatus.

FIG. 8 shows a general single-side polishing apparatus 21. The single-side polishing apparatus 21 is constituted of a turntable 23 having a polishing pad 22 attached thereto, a polishing agent supply mechanism 24, a polishing head 25, and the like. With the use of the single-side polishing apparatus 21, a wafer W is held by the polishing head 25, a polishing agent 26 is supplied onto the polishing pad 22 from the polishing agent supply mechanism 24, and the turntable 23 and the polishing head 25 are rotated respectively to slidably contact a surface of the wafer W with the polishing pad 22, thereby polishing one surface of the wafer W.

As a method for holding a wafer by a polishing head, a polishing head using a template is adopted. The polishing head using the template has a relatively simple structure, but it can provide a wafer having a flat shape after polishing by adjusting a depth of a concave portion in which a wafer is housed (which will be also referred to as a pocket depth hereinafter) in accordance with polishing conditions.

Figure 9:
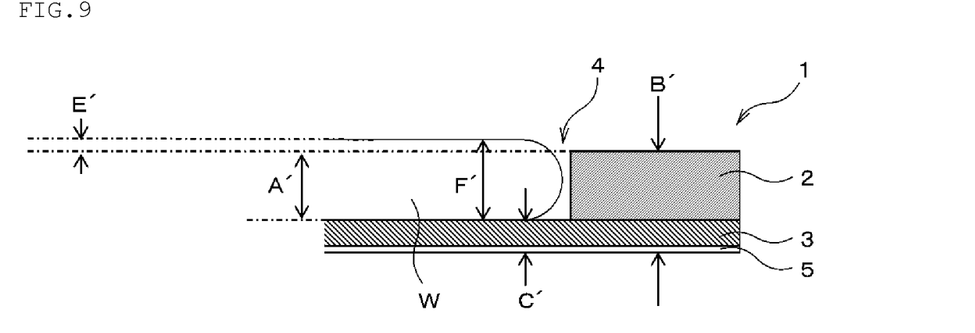
FIG. 9 is a schematic view showing a general template.

FIG. 9 shows a schematic view of a general template. As shown in FIG. 9, a template 1 has an annular member 2 and a backing pad 3 bonded thereto, and an inner peripheral surface of the annular member 2 and an upper surface of the backing pad 3 form a concave portion 4 to house and hold the wafer W. At the time of polishing, the wafer W is housed and held in this concave portion 4. This template 1 is bonded to a polishing head main body by a double sided tape 5 to constitute the polishing head. As a material of the annular member 2, a glass epoxy resin or the like is used.

A pocket depth A' is obtained by calculating a difference between a height B' of the annular portion and a height C' of the backing pad portion. When a thickness of an adhesive layer (not shown) between the annular member 2 and the backing pad 3 is ignored, a thickness of the annular member 2 is the pocket depth A'. Further, a difference between the pocket depth A' and a thickness F' of the wafer W is called a wafer protruding amount E', and an outer peripheral shape of the wafer W can be controlled by managing the wafer protruding amount E' or the pocket depth A' under the same polishing conditions.

As extreme examples, a case where an outer periphery of the wafer has a rise shape and a case where the same has a sag shape will now be described with reference to FIG. 10 and FIG. 11.

Figure 10:
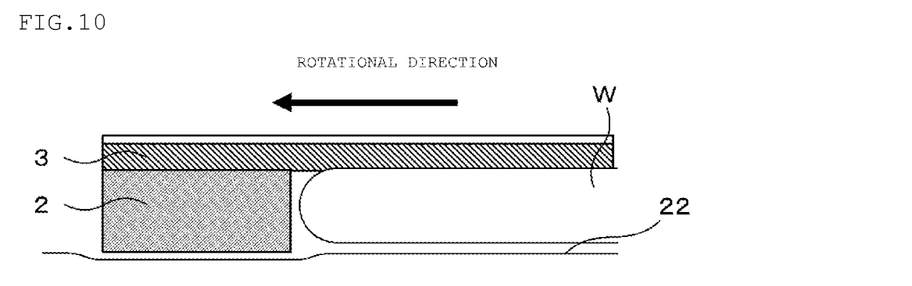
FIG. 10 is a schematic view showing a case where a thickness of the annular member is larger than a thickness of the wafer.
Figure 11:
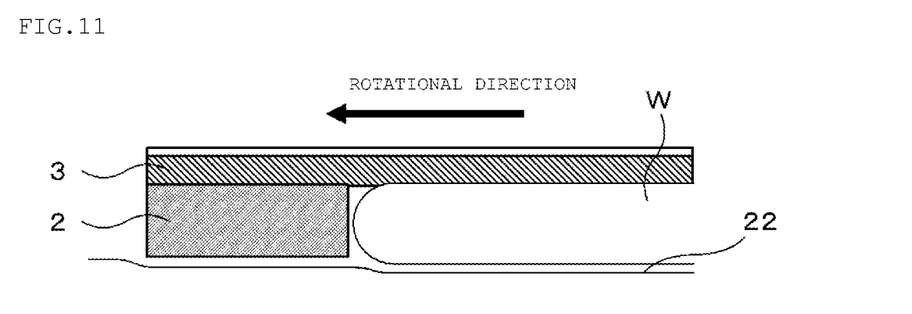
FIG. 11 is a schematic view showing a case where a thickness of the annular member is smaller than a thickness of the wafer.

As shown in FIG. 10, when the thickness of the annular member 2 is larger than the thickness of the wafer W, the wafer protruding amount becomes minus, and the annular member 2 compresses the polishing pad 22. Thus, a retainer effect to reduce a polishing pressure to the outer peripheral portion of the wafer W decreases a polishing amount of the outer peripheral portion of the wafer W, and the outer peripheral portion of the wafer W has the rise shape. On the other hand, as shown in FIG. 11, when the thickness of the annular member 2 is smaller than the thickness of the wafer W, since the wafer protruding amount becomes plus and compression of the polishing pad 22 by the annular member 2 is weakened, the polishing pressure to the outer peripheral portion of the wafer W increases, the outer peripheral portion of the wafer W is abundantly polished, and hence the outer peripheral portion of the wafer W has the sag shape.

In actual polishing, since a magnitude of the retainer effect is determined based on a difference in physical properties between the polishing pad and the backing pad which are elastic bodies, a polishing pressure, or the number of revolutions, the thickness of the annular member is adjusted and an optimum pocket depth is set in accordance with the polishing conditions so that a target outer peripheral shape can be provided.

Figure 12:
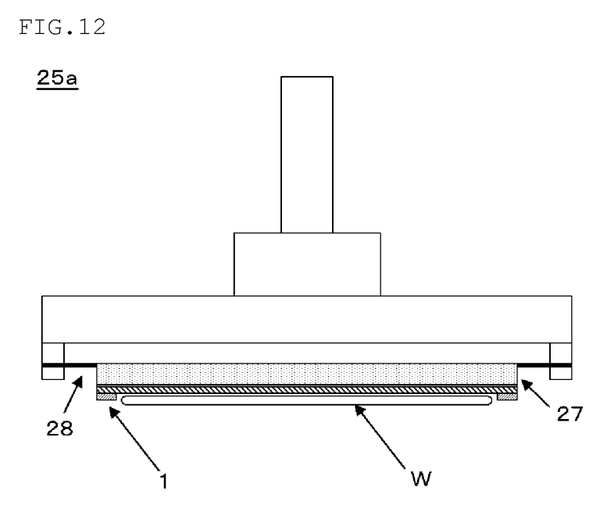
FIG. 12 is a schematic view showing a plate type polishing head.
Figure 13:
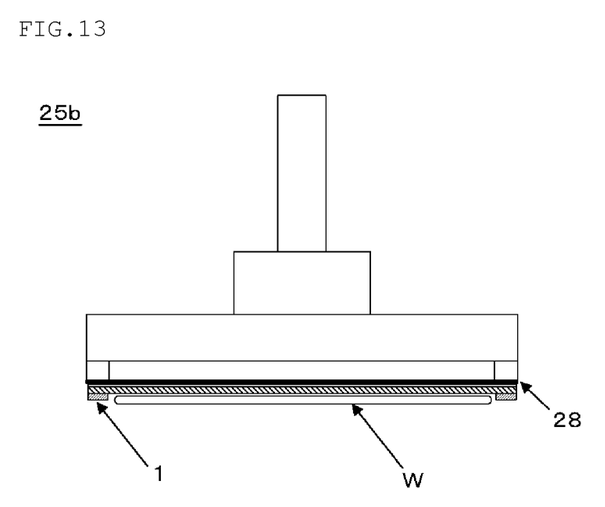
FIG. 13 is a schematic view showing a rubber type polishing head.

Each of FIG. 12 and FIG. 13 shows an example of a polishing head using such a template. A polishing head 25*a* in FIG. 12 is a polishing head which is a type that a template 1 is attached to a surface of a flat and smooth plate 27, and it is called a plate type. Furthermore, considering a material of the plate 27, it is also called a ceramic head or an SiC head.

A polishing head 25*b* in FIG. 13 is a polishing head which is a type that a template 1 is attached to a surface of a rubber 28, and it is called a rubber head.

Both the polishing heads 25*a* and 25*b* have a space using the rubber 28 as a partition wall in the polishing heads 25*a* and 25*b* respectively, and a load can be applied at the time of polishing by pressurizing this space with air or the like.

Since each of such polishing heads 25*a* and 25*b* does not have a complicated retainer mechanism in the polishing head, management of the polishing head is easy, and a running cost can be suppressed. Moreover, there is no problem of degradation of particles due to dust emission from the retainer mechanism.

However, since an independent retainer mechanism is not provided, a variation in thickness of the annular member of the template or a deviation from a target thickness directly affects a shape of the wafer outer peripheral portion, and hence a problem that quality tends to largely vary occurs as compared with the polishing head having the retainer mechanism.

Thus, for the purpose of suppressing a variation in thickness of the annular member, a method for lapping or polishing the annular member has been suggested. Such a template can suppress an influence of a variation in thickness due to the annular member.

Additionally, to reduce a variation in thickness of the backing pad or a variation in thickness of the template due to a variation in physical properties, there has been also suggested a method for grinding the lapped or polished annular member, engaging a peripheral edge portion of the backing pad with a ground portion, and directly bonding the annular member to a base material such as a double sided tape. Such a template can suppress an influence of a variation in thickness due to the backing pad.

Further, the method for lapping or polishing the annular member is superior in thickness controllability for the annular member, and hence a deviation from a target pocket depth can be also reduced.

Figure 14:
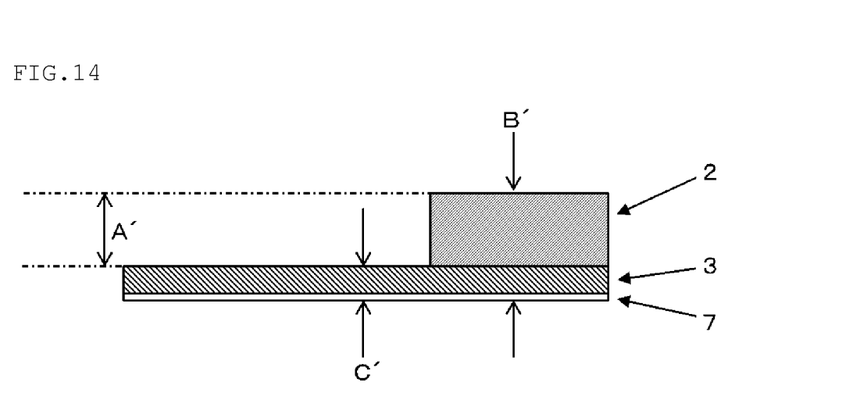
FIG. 14 is an explanatory drawing showing a conventional method for measuring a pocket depth.

FIG. 14 shows a current method for measuring a pocket depth. First, a height B' of the annular portion and a height C' of the backing pad portion are measured. Furthermore, a difference between the measured height B' of the annular portion and the measured height C' of the backing pad portion is calculated to obtain a pocket depth A' (A'=B'−C').

In the measurement, a contact type height measuring instrument or a measuring instrument using a laser is employed. In case of using the contact type height measuring instrument, it is often the case that measurement in eight directions is performed by one template and an average value of eight points is used. In case of the non-contact type based on the measuring instrument using the laser, it is often the case that heights of a whole circumference are annularly measured and a calculation is carried out by using their average.

Meanwhile, since the template is fixed to the polishing head by an adhesive or the like and used in this state, it is insufficient as a management method in the measurement before being bonded to such a polishing head as described above, and hence a method for measuring a shape of the backing pad in a state where the template is attached to the polishing head has been suggested (Patent Literature 1).

CITATION LIST

Patent Literature

Patent Literature 1: Japanese Unexamined Patent Application Publication No. 2004-239718

DISCLOSURE OF INVENTION

Problem to be Solved by the Invention

However, according to such a method as described above, since the measurement is carried out after bonding the template to the polishing head, whether target quality can be provided by the template before being bonded cannot be determined. Furthermore, there is no description about the measurement of the pocket depth.

In the present circumstances, even if the template having a target pocket depth is used, the outer peripheral shape of the wafer largely vary due to the template in some cases, and loading of products which need to have high quality must be held back until quality after polishing is confirmed after replacement of the template. Moreover, when the target quality cannot be provided, the template must be replaced, and there is also a problem of a reduction in productivity of the apparatus.

As to such a problem, since the backing pad is an elastic member, it is considered that the pocket depth differs depending on a no-load state where the pocket depth is measured and a state where a load in polishing is applied, a deviation from the target pocket depth occurs due to an influence of, e.g., a variation in physical properties of the backing pad, and quality varies.

In view of such a problem, it is an object of the present invention to provide a method for measuring a depth of a concave portion of a template in a state closer to a state during polishing than that in a conventional measuring method.

Means for Solving Problem

To achieve the object, according to the present invention, there is provided a method for measuring a template which is used to hold a wafer at the time of polishing the wafer and has an annular member and a backing pad attached thereto, an inner peripheral surface of the annular member and an upper surface of the backing pad forming a concave portion in which the wafer is housed and held, the method including:

preparing a measurement wafer and measuring a thickness of the measurement wafer; mounting the template on a reference plane; housing the measurement wafer in the concave portion of the template; measuring heights of the annular member and the measurement wafer from the reference plane in a state where a load is applied to the annular member of the template and the measurement wafer by using a pressing jig; and calculating a depth of the concave portion of the template in the state where the load is applied by using the pressing jig from the measured thickness of the measurement wafer and the heights of the annular member and the measurement wafer.

With such a configuration, since the depth of the concave portion of the template can be measured while applying the load by using the pressing jig, the depth of the concave portion can be measured in a state which is closer to the state during polishing than that in the conventional method. Further, the measurement can be performed without actually attaching the template to the polishing head or actually performing polishing. Thus, when polishing is performed by using the template set to a target concave depth, a variation in wafer outer peripheral shape can be suppressed, and productivity can be improved.

At this time, it is preferable that, in measuring the heights of the annular member and the measurement wafer, a pressing jig whose surface coming into contact with the annular member of the template and the measurement wafer is gouged into a U-like shape is used as the pressing jig, and the heights of the annular member and the measurement wafer are measured by the U-like gouged portion of the pressing jig.

With such a configuration, in a state where the load is applied to the annular member of the template and the measurement wafer, the heights of the annular member and the measurement wafer from the reference plane can be easily measured.

Furthermore, at this time, at the time of applying a load with the use of the pressing jig, a load per unit area provided by the pressing jig can be set to a load which is applied per unit area during polishing of the wafer.

With such a configuration, the depth of the concave portion of the template in the state further closer to the state during polishing can be measured.

Moreover, according to the present invention, there is provided a method for evaluating a template which is used to hold a wafer at the time of polishing the wafer, the method including:

previously obtaining a correlative relationship between a value of a depth of the concave portion of the template in the state where the load is applied, which is measured by the method for measuring a template according to the present invention, and flatness of the polished wafer polished by using the template; and then measuring a value of a depth of a concave portion of a template as an evaluation target in the state where the load is applied, which is measured by the method for measuring a template according to the present invention, and evaluating the template as the evaluation target from the measured value by using the correlative relationship.

With such a configuration, the flatness of the wafer after polishing can be estimated without actually polishing the wafer with the use of the template as the evaluation target.

Effect of the Invention

According to the method for measuring a template of the present invention, the depth of the concave portion of the template can be measured in the state further closer to the state during polishing than that in the conventional method.

Additionally, the measurement can be carried out without actually attaching the template to the polishing head.

Further, according to the method for evaluating a template of the present invention, the flatness of the wafer after polishing can be estimated without actually polishing the wafer by using the template as the evaluation target.

BEST MODE(S) FOR CARRYING OUT THE INVENTION

Although an embodiment of the present invention will now be described hereinafter, the present invention is not restricted thereto.

As described above, in a conventional method, to measure a depth of a template, a load at the time of polishing is not taken into consideration as shown in FIG. 14, and hence an outer peripheral shape of a wafer after polishing changes more than expected in some cases. Thus, the present inventor has repeatedly conducted the earnest examination to solve such a problem.

Consequently, the present inventor has conceived an idea of measuring a depth of a concave portion of a template while applying a load with the use of a pressing jig. As a result, the present inventor has discovered that the depth of the concave portion of the template in a state where the load is applied which is close to a state during polishing can be measured without actually attaching the template to a polishing head. Furthermore, the present inventor has fully examined the best mode for carrying out these discoveries to bring the present invention to completion.

A method for measuring a template according to the present invention will now be described hereinafter with reference to the drawings.

A measurement wafer which is used to measure a concave portion of a template is first prepared, and a thickness of the measurement wafer (which will be also simply referred to as a wafer hereinafter) is measured (SP1 in FIG. 1).

As the measurement wafer, for example, a flat wafer subjected to polishing can be used. As a position where the thickness of the wafer is measured, for example, a position which is 5 mm from an outer periphery of the wafer is marked, and a position which is 2 mm on the outer side of the marking (i.e., 3 mm from the outer periphery of the wafer) can be determined. At this time, a plurality of positions may be measured.

Figure 1:
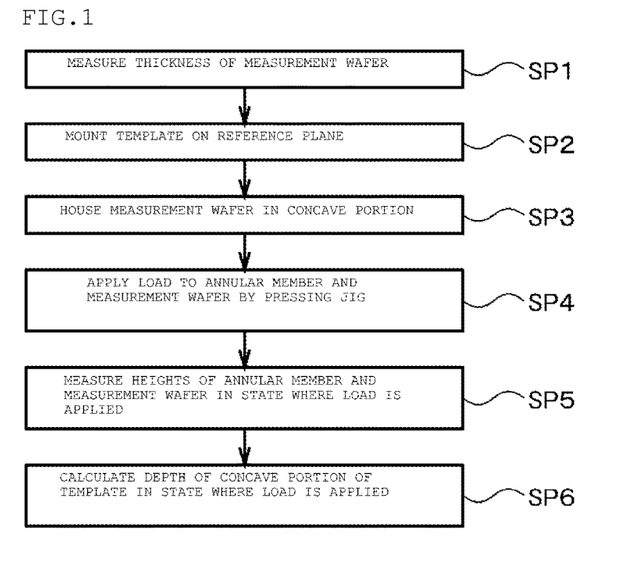
FIG. 1 is a process drawing showing an example of a method for measuring a template according to the present invention.
Figure 2:
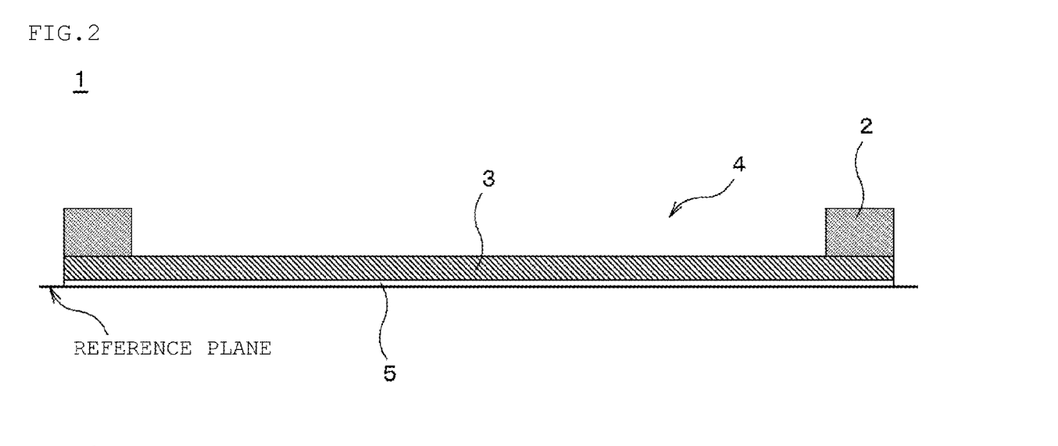
FIG. 2 is a schematic view of a template.

Such a template 1 which is a measurement target as shown in FIG. 2 is mounted on a reference plane (SP2 in FIG. 1). The template 1 has an annular member 2 and a backing pad 3 bonded thereto, and a concave portion 4 in which a wafer is housed and held is formed in a space surrounded by an inner peripheral surface of the annular member 2 and an upper surface of the backing pad 3. At the time of polishing, the wafer is housed and held in this concave portion 4. This template 1 is bonded to a polishing head main body by a double-sided tape 5 to constitute a polishing head. As a material of the annular member 2, a glass epoxy resin or the like is used.

Then, the measurement wafer is housed in the concave portion of the template (SP3 in FIG. 1).

Figure 3A:
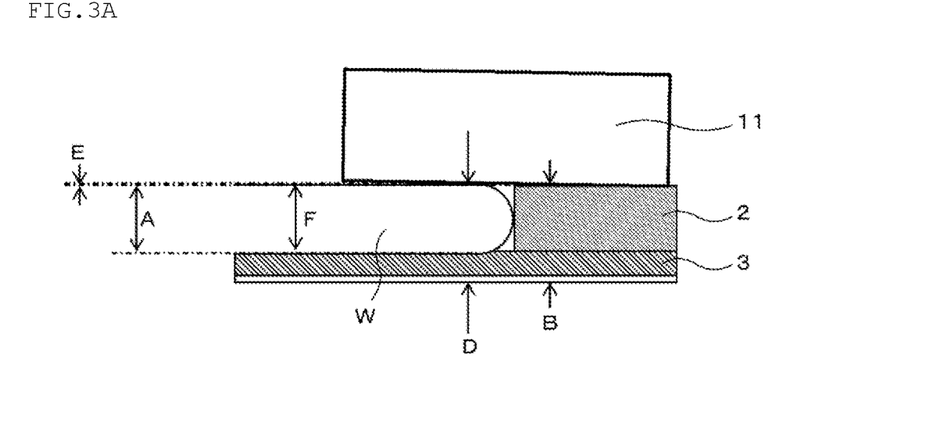
FIG. 3A is a schematic view showing a state where a load is applied to an annular member of the template and a wafer by using a pressing jig.

Subsequently, as shown in FIG. 3A, in a state where a load is applied to the annular member 2 of the template and the measurement wafer W by a pressing jig 11, a height B of the annular member 2 and a height D of the measurement wafer W from a reference plane are measured (SP4 and 5 in FIG. 1). It is to be noted that the thickness of the wafer measured at SP1 in FIG. 1 is denoted by a reference sign F.

As a position at which the height B of the annular member 2 from the reference plane is measured, for example, three points, i.e., a point which is 2 mm from an inner periphery of the annular member, a central portion, and a point which is 3 mm from an outer periphery of the same member are measured, and their average value can be determined as the height of the annular member. Further, as a position at which the height D of the measurement wafer W from the reference plane is measured, for example, it is possible to determine a position which is 3 mm from an outer periphery at which a thickness of the wafer is measured while using a position marked on the wafer as an index.

The pressing jig which can apply a load to the annular member 2 of the template and the measurement wafer W can suffice, and the pressing jig made of, e.g., SUS (stainless) can be used. In this case, it is preferable to use the pressing jig whose surface coming into contact with the template or the wafer has a polishing pad attached thereto. Such a pressing jig can prevent damage or contamination to the template.

Figure 4:
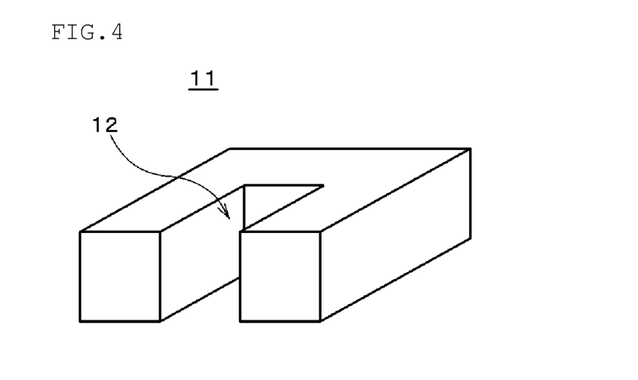
FIG. 4 is a schematic view showing an example of the pressing jig which can be used in the method for measuring a template according to the present invention.
Figure 5:
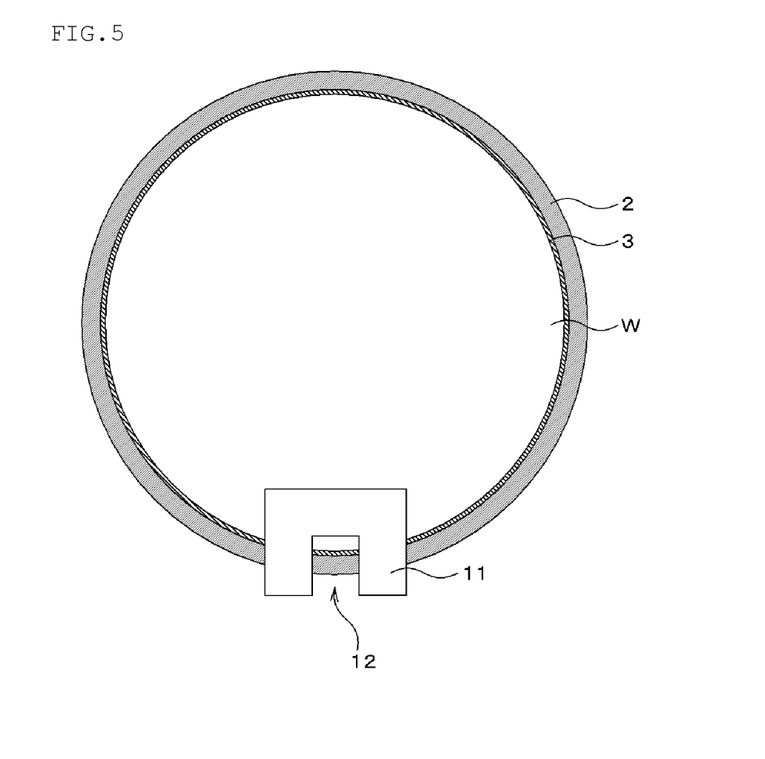
FIG. 5 is a schematic plane view showing a state where a load is applied to the annular member of the template and the wafer by using the pressing jig.

At this time, it is possible to use such a pressing jig 11 having a portion 12 gouged into a U-like shape as shown in FIG. 4. Furthermore, as shown in FIG. 5, it is preferable to measure the heights of the annular member 2 and the measurement wafer W by using the U-like gouged portion 12 of the pressing jig 11.

With this arrangement, the heights of the annular member 2 and the measurement wafer W from the reference plane can be easily measured in a state where a load is applied to the annular member 2 of the template and the measurement wafer W.

Further, at the time of applying the load by using the pressing jig 11, a load per unit area provided by the pressing jig 11 can be set to a load which is applied per unit area during polishing of the wafer.

With such a setting, a depth of the concave portion of the template in the polishing state can be measured without attaching the template to the polishing head and actually performing polishing.

For example, assuming that a polishing load is 100 g/cm$^2$, it is preferable to set a weight of the pressing jig 11 to 5 kg when a contact area of the pressing jig 11 is 50 cm$^2$.

Moreover, the depth of the concave portion of the template in a state where the load is applied by using the pressing jig is calculated from the measured thickness F of the measurement wafer, and the height B of the annular member and the height D of the measurement wafer in a state where the load is applied (SP6 in FIG. 1).

Figure 3B:
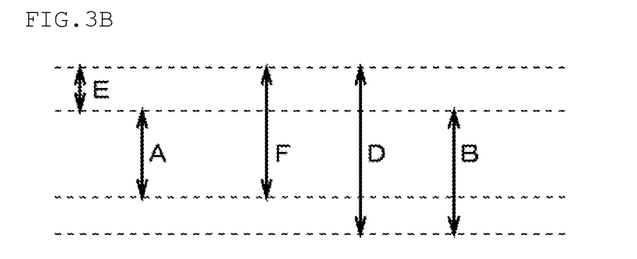
FIG. 3B is an enlarged explanatory drawing comprehensibly showing a relationship between ranges of A, B, D, E, and F in FIG. 3A.

Specifically, for example, a wafer protruding amount E in the state where the load is applied is first obtained from a difference between the height D of the measurement wafer and the height B of the annular member (E=D−B). Additionally, the pocket depth A in the state where the load is applied with the use of the pressing jig can be calculated from a difference between the thickness F of the measurement wafer and the wafer protruding amount E (A=F−E). It is to be noted that, as to this calculation, FIG. 3B shows an enlarged explanatory drawing which comprehensibly shows a relationship between ranges of A, B, D, E, and F in FIG. 3A. However, FIG. 3B is exaggerated for better understanding.

When the height D of the measurement wafer, the height B of the annular member, and the thickness F of the measurement wafer are measured at a plurality of positions, values of the pocket depth at the respective positions are obtained, and then an average pocket depth can be calculated.

As descried above, according to the method for measuring a template of the present invention, since the depth of the concave portion of the template is measured while applying the load with the use of the pressing jig, the depth of the concave portion of the template in the state where the load is applied can be measured without actually attaching the template to the polishing head. Moreover, according to the present invention, as different from conventional methods, since the pocket depth is measured in a state closer to a state during polishing, it is possible to reduce a percentage of requirement for replacing the template, which is observed in conventional examples, at the time of polishing using the template obtained by the measurement based on the method of the present invention, thus improving the productivity of polished wafers.

A description will now be given as to a method for evaluating a template using such a method for measuring a template of the present invention as mentioned above.

First, a correlative relationship of a value of the depth of the concave portion of the template in the state where a load is applied, which is based on such a method for measuring a template of the present invention as described above, and flatness of a polished wafer polished with the use of this template is obtained in advance. At this time, a load per unit area provided by the pressing jig is set to a load which is applied per unit area during polishing of the wafer.

As the flatness of the wafer after polishing, it is possible to use, e.g., values of SFQRmax and SFQDmax which are maximum values of SFQR (Site Front least sQuares <site> Range) and SFQD (Site Front least sQuares <site> Deviation).

Then, as to a template which is an evaluation target, a value of a depth of a concave portion of the template as the evaluation target in the state where the load per unit area during polishing of the wafer is applied is measured by the same measuring method.

Additionally, the template which is the evaluation target is evaluated from the measured value of the depth of the concave portion as the evaluation target by using the previously obtained correlative relationship.

With this arrangement, the flatness of the wafer after polishing can be estimated without actually polishing the wafer with the use of the template as the evaluation target. Consequently, it is possible to previously determine whether the template as the evaluation target can be used to provide the polished wafer having desired flatness before actual polishing. Thus, it is possible to reduce a percentage of requirement for replacing the template when the template cannot provide the desired flatness after actually starting polishing, thereby preventing a reduction in productivity of polished wafers.

EXAMPLE

The present invention will now be more specifically described with reference to an example and a comparative example hereinafter, but the present invention is not restricted thereto.

Example

The method for measuring a template according to the present invention was first carried out as described below.

A measurement wafer was prepared, eight positions which are 5 mm from an outer periphery were marked, and a thickness was measured at positions which are 2 mm on the outer side of the markings (3 mm from the outer periphery) by a digital height gage of Mitutoyo Corporation.

Then, a template to be measured was placed on a stone surface plate which serves as a reference plane, the measurement wafer was housed in a concave portion of the template, and heights of the measurement wafer W and an annular member 2 from the reference plane were measured by using a portion 12 gouged into a U-like shape in a state where a load was applied as shown in FIG. 5 with the use of such as pressing jig 11 as shown in FIG. 4. It is to be noted that a weight of the pressing jig 11 was adjusted to become equal to a load per unit area at the time of polishing.

As positions where the height D of the measurement wafer W from the reference plane is measured, positions which are 3 mm from the outer periphery where the thickness of the wafer was measured were determined while using the marked positions of the wafer as indexes. As to the height of the annular member, three points, i.e., a point which is 2 mm from an inner periphery of the annular member, a central portion, and a point which is 2 mm from the outer periphery were measured, and their average value was determined as the height of the annular member.

Pocket depths at the eight points were calculated from the thickness of the wafer, and the height of the wafer and the height of the annular member in a state where the wafer is housed in the template and the load is applied were calculated, and their average value was determined as the pocket depth.

Figure 6:
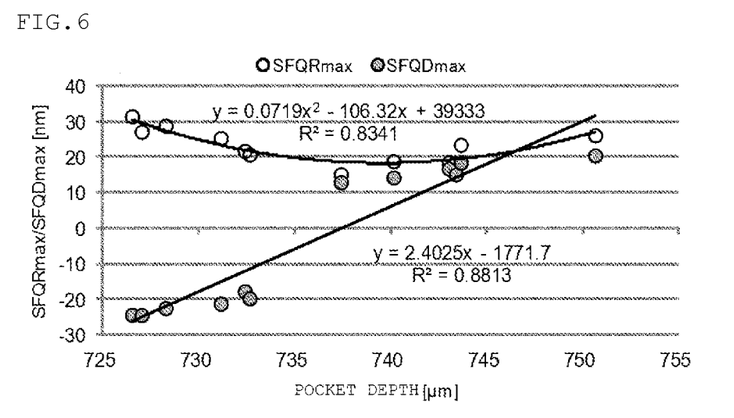
FIG. 6 is a graph showing measurement results in Example.

Pocket depths of a total of 12 templates were measured in the same manner, then each of these templates was bonded to a polishing head, and a silicon wafer having a diameter of 300 mm was actually polished. Further, flatness of the wafer after polishing was measured. Furthermore, a correlation of the pocket depth and the flatness of the wafer after polishing was obtained, and it is shown in FIG. 6.

As indexes of the flatness, values of SFQRmax and SFQD max which are maximum values of SFQR (a cell size: 26 mm×8 mm) and SFQD (a cell size: 26 mm×8 mm) were used. A measurement range was determined to be up to 2 mm from the outer periphery.

SFQD represents a maximum value of a displacement amount from an imaginary line per cell size, and it is an index having a positive or negative sign, and a value obtained by adding absolute values of a positive maximum displacement amount and a negative maximum displacement amount of SFQD of the same cell is SFQR of this cell.

Since a cell of SFQDmax is placed in an outer peripheral portion, and it can be an index which is used for determining an outer peripheral shape of the wafer. Specifically, when SFQDmax is positive, it means that a positive displacement from the imaginary line is large, and hence the outer peripheral shape of the wafer can be determined to be a rise shape. Further, when SFQDmax is negative, it means that a negative displacement from the imaginary line is large, the outer peripheral shape of the wafer can be determined to be a sag shape. It is to be noted that a minimum value of an absolute value of SFQDmax is approximately a half of SFQR in principle.

Comparative Example

A pocket depth of a template was measured by a conventional method for measuring a pocket depth. First, a micrometer of Mitutoyo Corporation was used to measure a height B' of an annular portion and a height C' of a backing pad portion as shown in FIG. 14 without applying a load as different from the present invention. At this time, the measurement was performed to one template in eight directions, and an average value of these eight points was determined as each of the height B' of the annular portion and the height C' of the backing pad portion.

Furthermore, a pocket depth A' was obtained by calculating a difference between the determined height B' of the annular portion and the determine height C' of the backing pad portion. Likewise, pocket depths of a total of 12 templates were measured.

Figure 7:
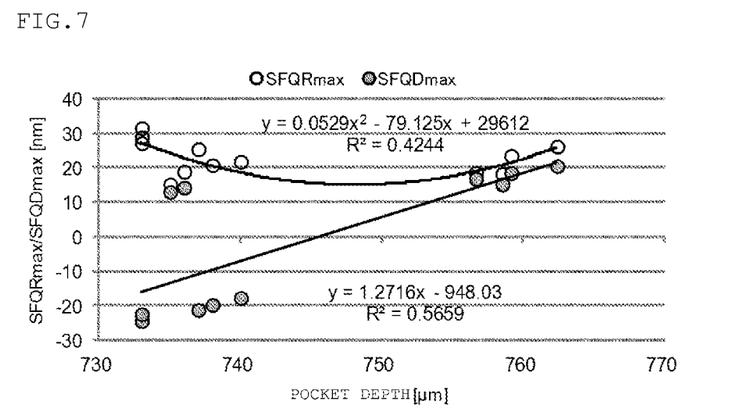
FIG. 7 is a graph showing measurement results in Comparative Example.

Then, each of these templates was bonded to a polishing pad, and each silicon wafer having a diameter of 300 mm was actually polished like Example. Moreover, flatness (SFQRmax and SFQDmax) of each wafer after polishing was measured like Example. Additionally, a correlation between the pocket depth and the flatness of the wafer after polishing was obtained, and it is shown in FIG. 7.

Here, results of Example and Comparative Example were compared, and a consideration was given as to effectiveness of the present invention. First, as shown in FIG. 7, SFQRmax in Comparative Example shows that a minimum value can be provided in the vicinity of the pocket depth of 750 µm or less. Further, SFQDmax shows a positive correlation with the pocket depth since a retainer effect becomes intensive when the pocket depth becomes larger. Contribution ratios ($R^2$) of SFQRmax and SFQDmax in Comparative Example are as low as 42% and 57%, respectively. Thus, they were insufficient as the method for examining a template.

On the other hand, as shown in FIG. 6, SFQRmax in Example shows that a minimum vale can be provided in the vicinity of the pocket depth of 740 µm, and a deviation of approximately 10 µm was observed as compared with the result of Comparative Example where the measurement was performed without applying the load. Furthermore, as compared with Comparative Example, contribution ratios ($R^2$) of SFQRmax and SFQDmax in Example were improved to 83% and 88% respectively, and a result which is sufficient for the method for examining a template was provided.

That is, when the measuring method according to the present invention is used, a pocket depth can be measured in a state closer to a state during polishing, and a correlative relationship having improved relations with flatness of each wafer after polishing can be grasped. Thus, it can be understood that an outer peripheral shape of the wafer after polishing can be prevented from varying as compared with a case using the conventional measuring method.

In Example, when the pocket depth is measured in the state where the load is applied by using the pressing jig in this manner, the depth of the concave portion of the template in a situation closer to that during polishing was able to be further accurately measured.

Moreover, when such a correlative relationship as shown in FIG. 6 obtained in this manner is used, since the flatness of each wafer after polishing can be estimated without actually polishing the wafer with the use of the template as an evaluation target, it is possible to determine whether that template as the evaluation target is to be used to provide a high-quality polished wafer.

Specifically, it can be understood that using a template having a pocket depth of, e.g., 740±10 µm under the currently adopted polishing conditions enables providing excellent flatness. Thus, when the pocket depth of the template as an evaluation target in a state where a load is applied is measured like Example and a measured value falls within the range of 740±10 µm, it can be determined that the template can be used to provide a wafer which has excellent flatness after polishing.

In addition, it can be understood that using the method according to the present invention enables evaluating physical properties of the backing pad by performing comparison and measurement while changing a weight of the pressing jig.

It is to be noted that the present invention is not restricted to the embodiment. The embodiment is an illustrative example, and any example which has substantially the same structure and exerts the same functions and effects as the technical concept described in claims of the present invention is included in the technical scope of the present invention.

The invention claimed is:

1. A method for measuring a template which is used to hold a wafer at the time of polishing the wafer and has an annular member and a backing pad attached thereto, an inner peripheral surface of the annular member and an upper surface of the backing pad forming a concave portion in which the wafer is housed and held, comprising:

preparing a measurement wafer and measuring a thickness of the measurement wafer; mounting the template on a reference plane; housing the measurement wafer in the concave portion of the template; measuring heights of the annular member and the measurement wafer from the reference plane in a state where a load is applied to the annular member of the template and the measurement wafer by using a pressing jig; and calculating a depth of the concave portion of the template in the state where the load is applied by using the pressing jig from the measured thickness of the measurement wafer and the heights of the annular member and the measurement wafer.

2. The method for measuring a template according to claim 1,
wherein, in measuring the heights of the annular member and the measurement wafer,
a pressing jig whose surface coming into contact with the annular member of the template and the measurement wafer is gouged into a U-like shape is used as the pressing jig, and
the heights of the annular member and the measurement wafer are measured by the U-like gouged portion of the pressing jig.

3. The method for measuring a template according to claim 1,
wherein, at the time of applying a load with the use of the pressing jig, a load per unit area provided by the pressing jig is set to a load which is applied per unit area during polishing of the wafer.

4. The method for measuring a template according to claim 2,
wherein, at the time of applying a load with the use of the pressing jig, a load per unit area provided by the pressing jig is set to a load which is applied per unit area during polishing of the wafer.

5. A method for evaluating a template which is used to hold a wafer at the time of polishing the wafer, comprising:
previously obtaining a correlative relationship between a value of a depth of the concave portion of the template in the state where the load is applied, which is measured by the method according to claim 3, and flatness of the polished wafer polished by using the template; and
then measuring a value of a depth of a concave portion of a template as an evaluation target in the state where the load is applied, which is measured by the method described in claim 3, and evaluating the template as the evaluation target from the measured value by using the correlative relationship.

6. A method for evaluating a template which is used to hold a wafer at the time of polishing the wafer, comprising:
previously obtaining a correlative relationship between a value of a depth of the concave portion of the template in the state where the load is applied, which is measured by the method according to claim 4, and flatness of the polished wafer polished by using the template; and
then measuring a value of a depth of a concave portion of a template as an evaluation target in the state where the load is applied, which is measured by the method described in claim 4, and evaluating the template as the evaluation target from the measured value by using the correlative relationship.

\* \* \* \* \*